(12) United States Patent
McCaffrey et al.

(10) Patent No.: US 10,138,750 B2
(45) Date of Patent: Nov. 27, 2018

(54) BOAS SEGMENTED HEAT SHIELD

(71) Applicant: UNITED TECHNOLOGIES CORPORATION, Farmington, CT (US)

(72) Inventors: Michael G. McCaffrey, Windsor, CT (US); Benjamin F. Hagan, Winston-Salem, NC (US); David Richard Griffin, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 384 days.

(21) Appl. No.: 15/071,439

(22) Filed: Mar. 16, 2016

(65) Prior Publication Data

US 2017/0268371 A1    Sep. 21, 2017

(51) Int. Cl.
| | | |
|---|---|---|
| *F01D 11/08* | (2006.01) | |
| *F01D 11/12* | (2006.01) | |
| *F01D 5/02* | (2006.01) | |
| *F01D 9/04* | (2006.01) | |

(Continued)

(52) U.S. Cl.
CPC ............ *F01D 11/12* (2013.01); *F01D 5/02* (2013.01); *F01D 9/041* (2013.01); *F01D 11/08* (2013.01); *F01D 25/08* (2013.01); *F02C 7/28* (2013.01); *F05D 2220/32* (2013.01); *F05D 2230/60* (2013.01); *F05D 2240/11* (2013.01); *F05D 2260/231* (2013.01); *F05D 2260/30* (2013.01); *F05D 2260/38* (2013.01); *F05D 2260/52* (2013.01); *Y02T 50/672* (2013.01)

(58) Field of Classification Search
CPC .......... F01D 11/12; F01D 11/14; F01D 25/08; F01D 9/041; F01D 5/02; F01D 11/122; F01D 11/125; F01D 11/27; F01D 11/16; F01D 11/20; F01D 11/22; F01D 11/08; F05D 2260/52; F05D 2260/231; F05D 2230/60; F05D 2220/32
See application file for complete search history.

(56) References Cited

U.S. PATENT DOCUMENTS

| | | |
|---|---|---|
| 4,087,199 A | 5/1978 | Hemsworth et al. |
| 4,527,385 A | 7/1985 | Jumelle et al. |
| 4,728,257 A | 3/1988 | Handschuh |

(Continued)

FOREIGN PATENT DOCUMENTS

| | | |
|---|---|---|
| EP | 0770761 | 5/1997 |
| EP | 1362983 | 11/2003 |

(Continued)

OTHER PUBLICATIONS

European Search Report for EP Application No. 17160063.8 dated Aug. 17, 2017.

*Primary Examiner* — Eldon Brockman
(74) *Attorney, Agent, or Firm* — Carlson, Gaskey & Olds, P.C.

(57) ABSTRACT

A seal assembly includes a seal arc segment defining first and second seal supports with a carriage defining first and second support members. The first support member supports the seal arc segment in a first ramped interface, and the second support member supports the seal arc segment in a second ramped interface. A spring is configured to bias the seal arc segment axially. A heat shield is radially inward of the spring.

20 Claims, 5 Drawing Sheets

(51) Int. Cl.
*F01D 25/08* (2006.01)
*F02C 7/28* (2006.01)

(56) References Cited

U.S. PATENT DOCUMENTS

| | | | |
|---|---|---|---|
| 5,423,659 A | 6/1995 | Thompson | |
| 5,609,469 A | 3/1997 | Worley et al. | |
| 5,639,210 A | 6/1997 | Carpenter et al. | |
| 6,142,731 A | 11/2000 | Dewis et al. | |
| 6,431,825 B1 | 8/2002 | McLean | |
| 6,726,448 B2 * | 4/2004 | McGrath | F01D 11/12 415/135 |
| 6,733,235 B2 | 5/2004 | Alford et al. | |
| 6,942,203 B2 * | 9/2005 | Schroder | F01D 9/04 267/160 |
| 7,052,235 B2 | 5/2006 | Alford et al. | |
| 7,163,206 B2 | 1/2007 | Cross et al. | |
| 7,435,049 B2 | 10/2008 | Ghasripoor et al. | |
| 7,527,472 B2 | 5/2009 | Allen | |
| 7,959,407 B2 | 6/2011 | Tholen | |
| 8,123,466 B2 | 2/2012 | Pietraszkiewicz et al. | |
| 8,303,247 B2 | 11/2012 | Schlichting et al. | |
| 8,439,636 B1 | 5/2013 | Liang | |
| 8,534,995 B2 | 9/2013 | McCaffrey | |
| 8,568,091 B2 | 10/2013 | McCaffrey | |
| 8,585,357 B2 | 11/2013 | DiPaola et al. | |
| 8,596,963 B1 | 12/2013 | Liang | |
| 8,790,067 B2 | 7/2014 | McCaffrey et al. | |
| 8,876,458 B2 | 11/2014 | Thibodeau et al. | |
| 8,920,127 B2 | 12/2014 | McCaffrey | |
| 8,944,756 B2 | 2/2015 | Lagueux | |
| 9,039,358 B2 | 5/2015 | Tholen et al. | |
| 9,115,596 B2 | 8/2015 | Clouse | |
| 9,169,739 B2 | 10/2015 | Mironets et al. | |
| 9,200,530 B2 | 12/2015 | McCaffrey | |
| 9,228,447 B2 | 1/2016 | McCaffrey | |
| 9,932,901 B2 * | 4/2018 | Sener | F01D 11/08 |
| 2003/0215328 A1 * | 11/2003 | McGrath | F01D 11/12 415/173.3 |
| 2006/0038358 A1 | 2/2006 | James | |
| 2008/0211192 A1 | 9/2008 | Pietraszkiewicz et al. | |
| 2009/0096174 A1 | 4/2009 | Spangler et al. | |
| 2009/0169368 A1 | 7/2009 | Schlichting et al. | |
| 2009/0208322 A1 | 8/2009 | McCaffrey | |
| 2010/0226760 A1 | 9/2010 | McCaffrey | |
| 2011/0044803 A1 | 2/2011 | Di Paola et al. | |
| 2011/0044804 A1 | 2/2011 | DiPaola et al. | |
| 2011/0189009 A1 * | 8/2011 | Shapiro | F01D 11/12 415/209.3 |
| 2012/0195743 A1 | 8/2012 | Walunj et al. | |
| 2012/0275898 A1 | 11/2012 | McCaffrey et al. | |
| 2013/0017057 A1 | 1/2013 | Lagueux | |
| 2013/0022469 A1 | 1/2013 | McCaffrey | |
| 2013/0113168 A1 | 5/2013 | Lutjen et al. | |
| 2013/0209240 A1 | 8/2013 | McCaffrey | |
| 2014/0016761 A1 | 1/2014 | Werner | |
| 2014/0017072 A1 | 1/2014 | McCaffrey | |
| 2014/0023480 A1 | 1/2014 | McCaffrey | |
| 2014/0033149 A1 | 1/2014 | Groves et al. | |
| 2014/0044528 A1 | 2/2014 | Clouse | |
| 2014/0053040 A1 | 2/2014 | Hargan | |
| 2014/0127006 A1 | 5/2014 | Romanov et al. | |
| 2014/0133955 A1 | 5/2014 | McCaffrey et al. | |
| 2014/0186152 A1 | 7/2014 | McCaffrey et al. | |
| 2015/0016954 A1 | 1/2015 | Thibodeau et al. | |
| 2015/0031764 A1 | 1/2015 | Kraus et al. | |
| 2015/0226132 A1 | 8/2015 | Thill et al. | |
| 2015/0337672 A1 | 11/2015 | McCaffrey et al. | |
| 2015/0369076 A1 | 12/2015 | McCaffrey et al. | |
| 2016/0003078 A1 | 1/2016 | Stevens et al. | |
| 2016/0003080 A1 | 1/2016 | Mcgarrah | |

FOREIGN PATENT DOCUMENTS

| | | |
|---|---|---|
| FR | 2540938 | 8/1984 |
| GB | 2480766 | 11/2011 |
| WO | 2015038906 | 3/2015 |
| WO | 2015047478 | 4/2015 |
| WO | 2015061108 | 4/2015 |
| WO | 2015088656 | 6/2015 |
| WO | 2015109292 | 7/2015 |
| WO | 2015112354 | 7/2015 |

* cited by examiner

BOAS SEGMENTED HEAT SHIELD

BACKGROUND OF THE INVENTION

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged. The arc segments may be abradable to reduce the radial gap with the tips of the blades.

SUMMARY OF THE INVENTION

A seal assembly according to an example of the present disclosure includes a seal arc segment that defines first and second seal supports with a carriage that defines first and second support members. The first support member supports the seal arc segment in a first ramped interface and the second support member supports the seal arc segment in a second ramped interface. A spring is configured to bias the seal arc segment axially. A heat shield is radially inward of the spring.

In a further embodiment of any of the foregoing embodiments, the spring is configured to bias the seal arc segment axially toward the carriage.

In a further embodiment of any of the foregoing embodiments, the seal arc segment has a circumferential length, and the heat shield extends circumferentially substantially the circumferential length of the seal arc segment.

In a further embodiment of any of the foregoing embodiments, the heat shield includes a first axially-extending leg radially inward of the spring.

In a further embodiment of any of the foregoing embodiments, the heat shield includes radially outer end with a second axially-extending leg.

In a further embodiment of any of the foregoing embodiments, the axially-extending leg radially inward of the spring extends in a first axial direction and the second axially-extending leg extends in a second axial direction opposite from the first axial direction.

In a further embodiment of any of the foregoing embodiments, the second axially-extending leg is disposed radially outward of the seal arc segment.

In a further embodiment of any of the foregoing embodiments, the heat shield includes a radially-extending leg disposed axially between the spring and the seal arc segment.

In a further embodiment of any of the foregoing embodiments, the seal arc segment having first and second axial ends, the spring adjacent the first axial end and configured to bias the second axial end against the carriage.

In a further embodiment of any of the foregoing embodiments, the heat shield is a first material, and the carriage is a second material different from the first material.

In a further embodiment of any of the foregoing embodiments, the carriage and the spring define a first cavity the heat shield and the spring define a second cavity, and the spring includes a passage configured to provide communication between the first cavity and the second cavity.

A gas turbine engine according to an example of the present disclosure includes a rotor rotatable about an axis. A seal arc segment radially outward of the rotor defines first and second seal supports. A carriage defines first and second support members. The first support member supports the seal arc segment in a first ramped interface, and the second support member supports the seal arc segment in a second ramped interface. A spring is configured to bias the seal arc segment axially. A heat shield is radially inward of the spring.

In a further embodiment of any of the foregoing embodiments, the heat shield includes an axially-extending leg radially inward of the spring.

A further embodiment of any of the foregoing embodiments includes, a vane structure is spaced axially from the rotor, wherein the axially-extending leg extends axially in the axial space between the vane structure and the rotor.

In a further embodiment of any of the foregoing embodiments, the heat shield includes a radially-extending leg axially between the spring and the seal arc segment.

In a further embodiment of any of the foregoing embodiments, the spring is configured to bias the seal arc segment axially toward the carriage.

In a further embodiment of any of the foregoing embodiments, the seal arc segment has a circumferential length, and the heat shield extends circumferentially substantially the circumferential length of the seal arc segment.

In a further embodiment of any of the foregoing embodiments, the carriage and the spring define a first cavity, the heat shield and the spring define a second cavity, and the spring includes a passage configured to provide communication between the first cavity and the second cavity.

A method of assembling a seal assembly according to an example of the present disclosure includes providing a seal arc segment that defines first and second seal supports. The method further includes supporting the seal arc segment on a carriage that defines first and second support members. The first support member supports the seal arc segment in a first ramped interface and the second support member supports the seal arc segment in a second ramped interface. The method further includes biasing the seal arc segment axially with a spring, and providing a heat shield radially inward of the spring.

In a further embodiment of any of the foregoing embodiments, the heat shield includes an axially-extending leg radially inward of the spring.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
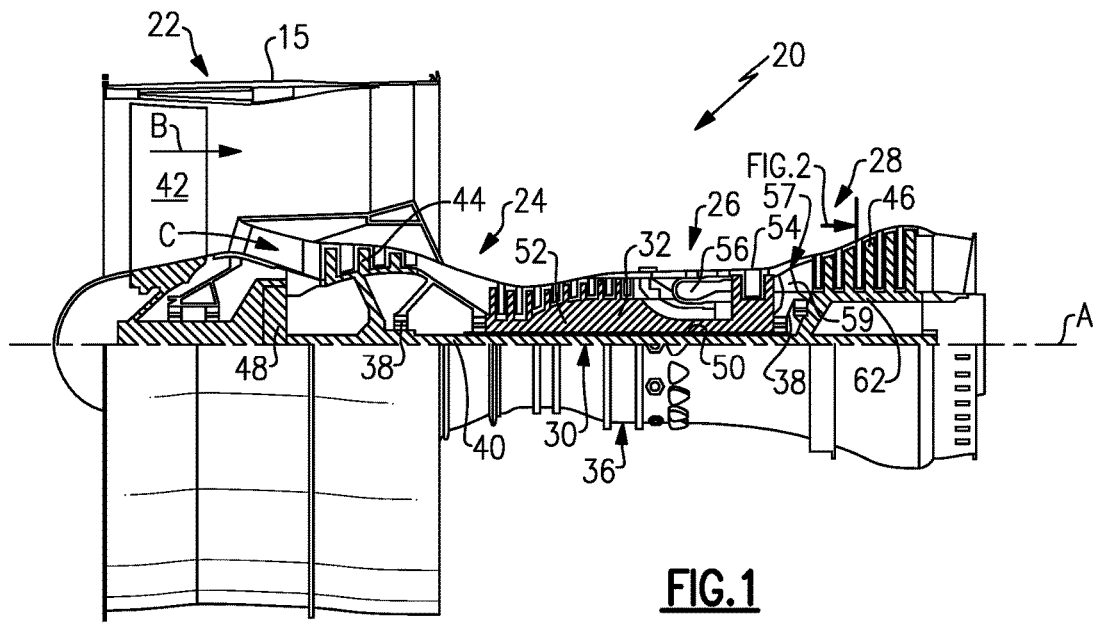
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second.

Figure 2:
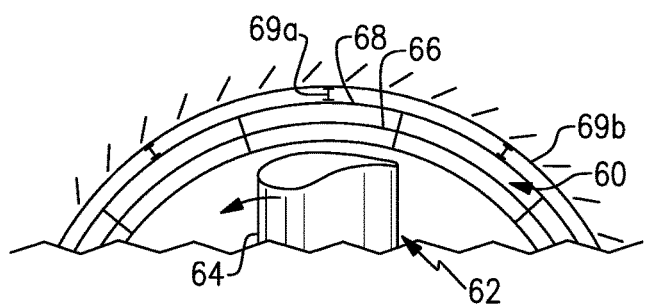
FIG. 2 illustrates an axial view of a seal assembly of a gas turbine engine.

FIG. 2 illustrates a partial axial view through a portion of one of the stages of the turbine section 28. In this example, the turbine section 28 includes an annular blade outer air seal (BOAS) system or assembly 60 (hereafter BOAS 60) that is located radially outwards of a rotor 62 that has a row of rotor blades 64. As can be appreciated, the BOAS 60 can alternatively or additionally be adapted for other portions of the engine 20, such as the compressor section 24.

The BOAS 60 includes a plurality of seal arc segments 66 that are circumferentially arranged in an annulus around the central axis A of the engine 20. The seal arc segments 66 are mounted in a carriage 68, which may be continuous or segmented. The carriage 68 is mounted through one or more connections 69a to a case structure 69b. The BOAS 60 is in close radial proximity to the tips of the blades 64, to reduce the amount of gas flow that escapes around the blades 64.

Figure 3:
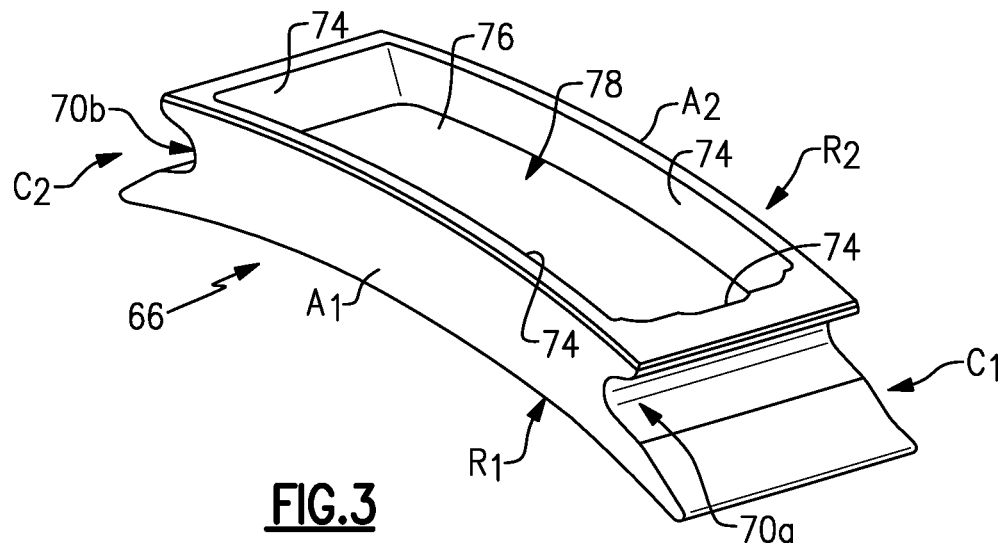
FIG. 3 illustrates an isolated view of a seal arc segment of a seal assembly.
Figure 4:
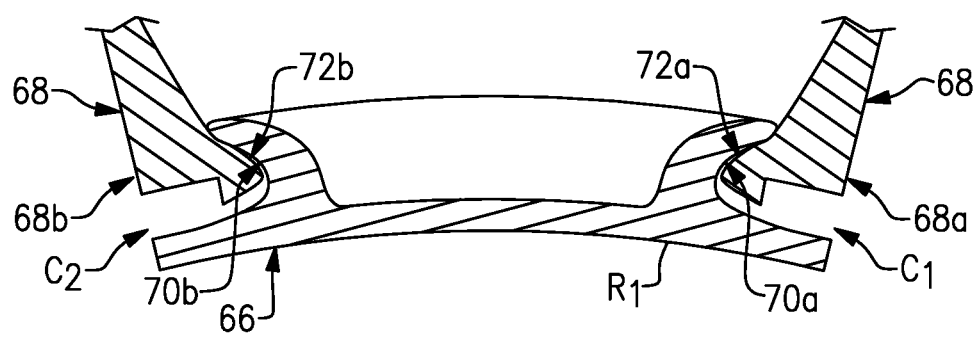
FIG. 4 illustrates a seal arc segmented mounted in a carriage.

FIG. 3 illustrates an isolated view of a representative one of the seal arc segments 66, and FIG. 4 illustrates a view of the seal arc segment 66 mounted in a portion of the carriage 68. As will be appreciated, the examples herein may be used to provide compliant, low-stress mounting of the seal arc segment 66 in the carriage 68. In particular such compliant low-stress mounting may be useful for seal arc segments 66 formed of materials that are sensitive to stress concentrations, although this disclosure is not limited and other types of seals and materials will also benefit.

Although not limited, the seal arc segments 66 (i.e., the body thereof) may be monolithic bodies that are formed of a high thermal-resistance, low-toughness material. For example, the seal arc segments 66 may be formed of a high thermal-resistance low-toughness metallic alloy or a ceramic-based material, such as a monolithic ceramic or a ceramic matrix composite. One example of a high thermal-resistance low-toughness metallic alloy is a molybdenum-based alloy. Monolithic ceramics may be, but are not limited to, silicon carbide (SiC) or silicon nitride ($Si_3N_4$). Alternatively, the seal arc segments 66 may be formed of high-toughness material, such as but not limited to metallic alloys.

Each seal arc segment 66 is a body that defines radially inner and outer sides R1/R2, first and second circumferential ends C1/C2, and first and second axial sides A1/A2. The radially inner side R1 faces in a direction toward the engine central axis A. The radially inner side R1 is thus the gas path side of the seal arc segment 66 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In this example, the first and second circumferential ends C1/C2 define, respectively, first and second seal supports 70a/70b by which the carriage 68 radially supports or suspends the seal arc segment 66. The seal arc segment 66 is thus end-mounted. In the example shown, the first and second seal supports 70a/70b have a dovetail geometry.

The carriage 68 includes first and second support members 68a/68b that serve to radially support the seal arc segment 66 via, respectively, the first and second seal supports 70a/70b. In the example shown, the first and second support members 68a/68b are hook supports that interfit with the dovetail geometry of the first and second seal supports 70a/70b.

The first support member 68a supports the seal arc segment 66 in a first ramped interface 72a and the second support member 68b supports the seal arc segment 66 in a second ramped interface 72b. For instance, each of the ramped interfaces 72a/72b includes at least one ramped surface on the seal arc segment, the carriage 68, or both. In the example shown, the surfaces of the first and second seal supports 70a/70b and the surfaces of the first and second support members 68a/68b are ramped. The term "ramped" as used herein refers to a support surface that is sloped with respect to both the radial and circumferential directions.

The ramped interfaces 72a/72b permit the seal arc segment 66 to move circumferentially with respect to the carriage 68 as the seal arc segment 66 slides up and down the ramped interfaces 72a/72b. Friction in the ramped interfaces 72a/72b during sliding movement can potentially provide damping, and the relatively large contact area across the ramped interfaces 72a/72b distributes loads transferred through the ramped interfaces 72a/72b, which also serves to potentially reduce stress concentrations on the seal arc segment 66.

The radially outer side R2 of the seal arc segment 66 includes radially-extending rails or sidewalls 74 (FIG. 3) and a radially inner or innermost surface 76 that joins the sidewalls 74. The sidewalls 74 and the radially inner surface 76 define a pocket 78 on the radially outer side R2 of the seal arc segment 66. In this example, the pocket 78 is open on its radially outer side. In one example, the pocket 78 extends a majority of the circumferential length of the seal arc segment 66. The pocket 78 may also extend a majority of the axial length of the seal arc segment 66.

Figure 5:
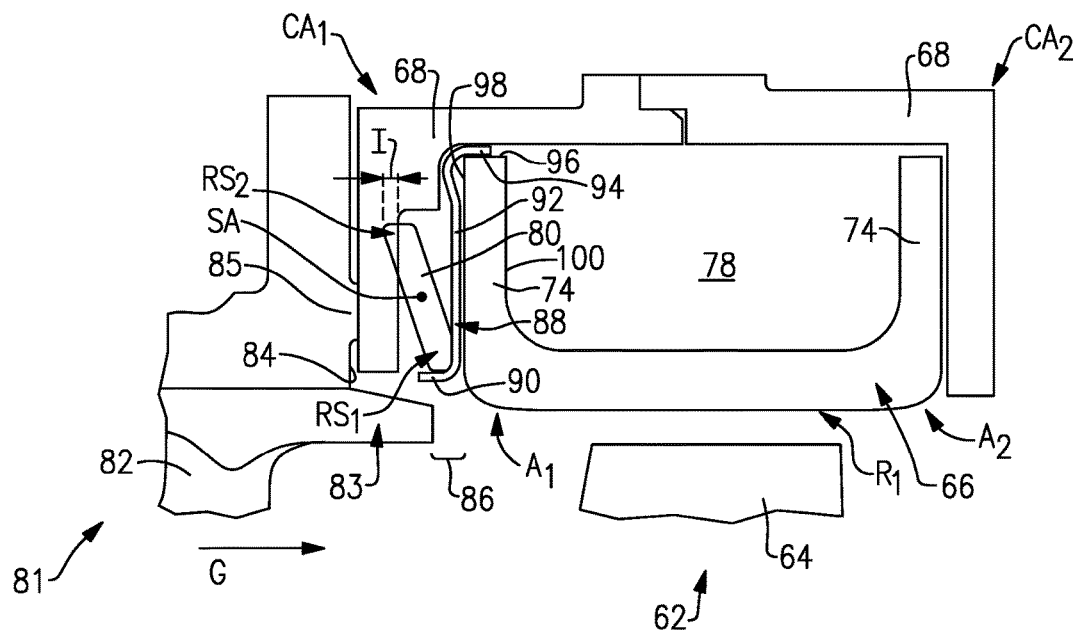
FIG. 5 illustrates an axial cross section of a seal arc segment mounted with a segmented heat shield.

As illustrated in FIG. 5, the BOAS 60 also includes a spring 80 to bias the seal arc segment 66 axially against the axial end CA2 of the carriage 68. In this example, the spring 80 is disposed at the first axial end CA1 of the carriage 68, axially between the axial end CA1 of the carriage and the sidewall 74 at the first axial side A1 of the seal arc segment 66. At least a partial amount of a vane structure 81 is axially forward of the carriage 68 and the rotor section 62. The vane structure 81 includes a stator vane 82 extending radially inward from an outer platform 83, which extends axially aft of the axial end CA1 of the carriage 68. The outer platform 83 includes an axial face 84, which has a chordal seal 85 that is contiguous with an outer surface of the axial end CA1 of the carriage 68. There is thus an axial gap 86 between the stator vane 82 and the seal arc segment 66 that potentially allows gas from the gaspath G to travel radially outward from the gaspath G toward the spring 80.

Figure 6:
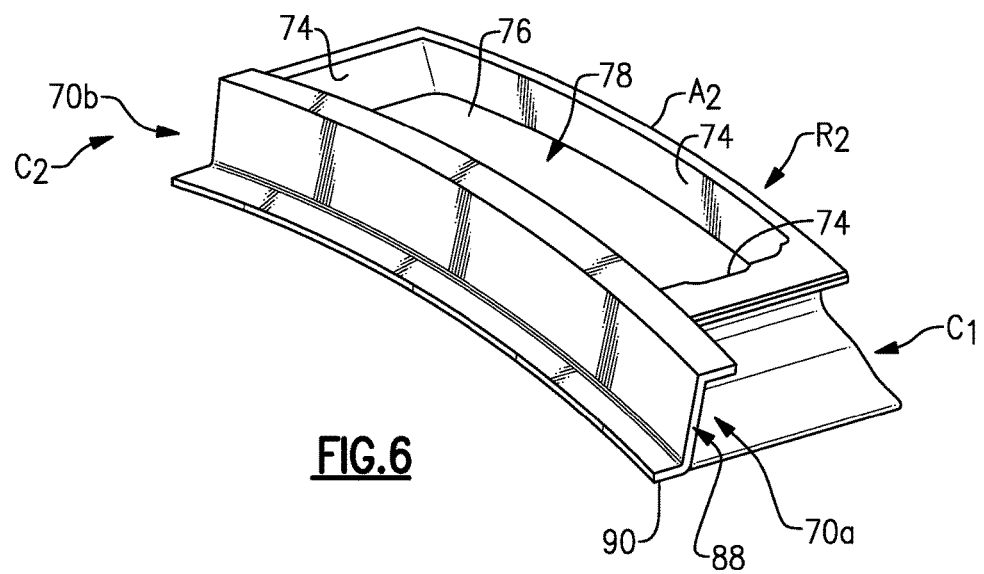
FIG. 6 illustrates a seal arc segment and a segmented heat shield.

A segmented heat shield 88 is provided that is at least partially radially inward of the spring 80. The segmented heat shield 88 includes an axially-extending leg 90 that extends axially at least partially across the axial gap 86 and is radially inward of the radially inner end RS1 of the spring 80. In the example, the leg 90 extends axially forward the entire distance of the gap 86. The leg 90 shields the spring 80 from hot gasses from flowing radially through the axial gap 86 from the gaspath G. There is thus no radial line of sight through the gap 86 to the spring 80 from the gaspath G. The heat shield 88 may extend circumferentially substantially the length of the seal arc segment 66, as illustrated in FIG. 6.

The axially-extending leg 90 may extend axially from a radially-extending leg 92 of the segmented heat shield 88. The radially-extending leg 92 may be axially between the spring 80 and the seal arc segment 66. A second axially-extending leg 94 may extend axially in an opposite direction from the leg 90 from the radially extending leg 92. The leg 94 may be radially outward of a radially outer surface 96 of the sidewall 74 of the seal arc segment 66. The radially-extending leg 92 of the segmented heat shield 88 may interface with a portion of the surface 98 of the sidewall 74 axially opposite the sidewall 74 from the radial faced surface 100 interior to the pocket 78.

Figure 7:
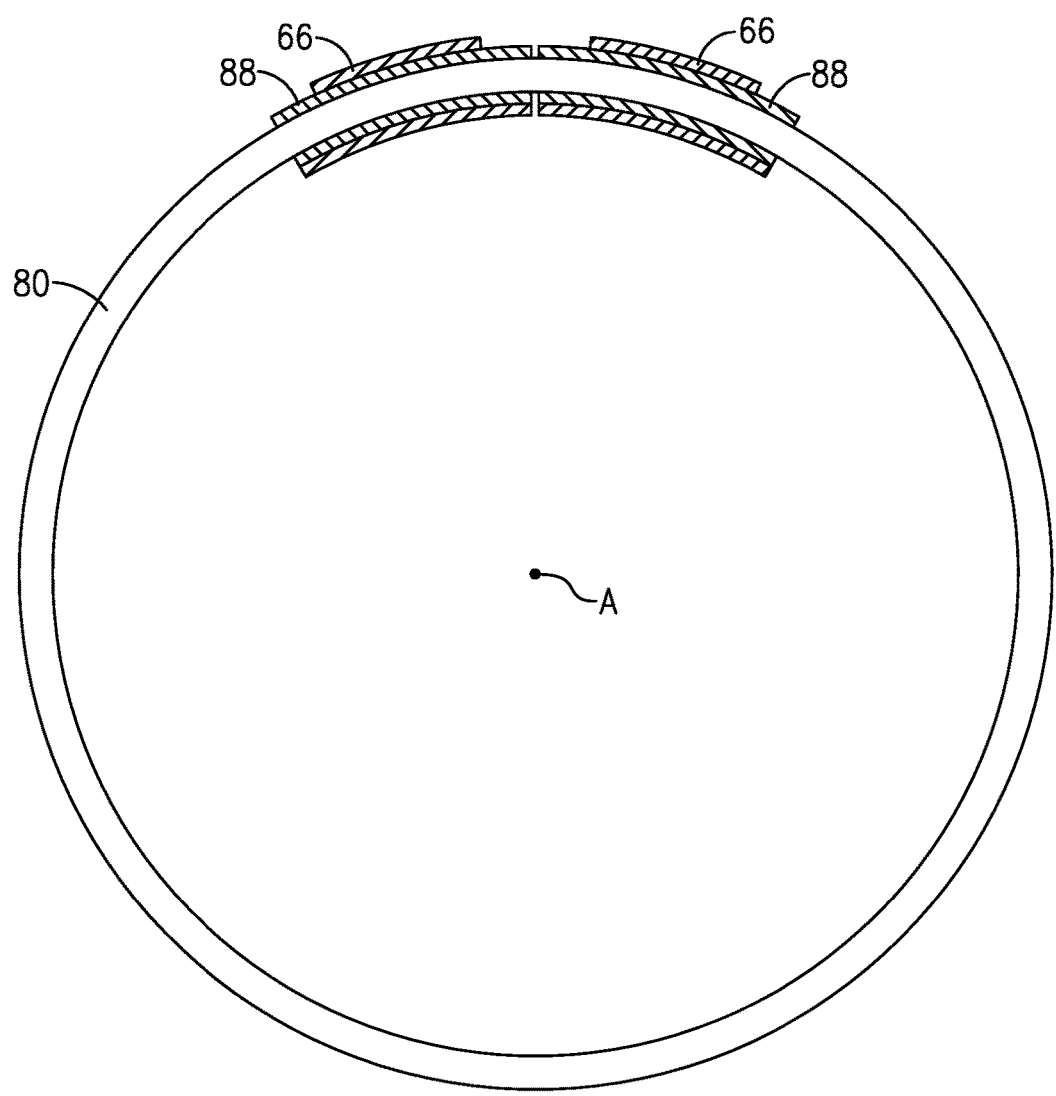
FIG. 7 schematically illustrates an example spring.

The spring 80 may be designed to form an interference fit I with the carriage 68 at the radially outer end RS2 of the spring 80. As one example, the spring 80 extends axially from the seal arc segment 66 to the carriage 68 as it extends radially outward. The spring 80 may be a 360 degree disc spring or diaphragm seal about engine axis A and extending along adjacent seal arc segments 66 and corresponding segmented heat shields 88, as illustrated schematically in FIG. 7. With the heat shields extending substantially the circumferential length of the seal arc segment 66, adjacent heat shields 88 may be arranged closely to limit the circumferential gap between adjacent heat shields 88 to limit exposure of spring 80 to hot gases from the gas path G. Referring back to FIG. 5, the interference fit I allows the radial ends R1 and R2 to deflect axially toward each other, causing the spring to rotate about a torsional axis SA extending circumferentially through the spring 80. The force applied by the interference fit I results in internal compressive and tensile stresses within the spring 80, which resist the interference fit I. If exposed to temperatures above a certain level, the spring 80 may begin to creep and relieve the stresses within. The segmented heat shield 88 shields the spring 80 from the Gaspath G temperatures, maintaining the necessary internal stresses to maintain the necessary force applied by the interference fit.

The radially inner end RS1 of the spring 80 may be radially outward of the radially inner end R1 of the seal arc segment 66. The spring 80 and heat shield 88 are radially outward of the axially-extending portion of the platform 83.

The segmented heat shield 88 may be a metallic alloy, such as, but not limited to, a cobalt alloy. In the example, the segmented heat shield 88 and the carriage 68 are separate components, and may be made of different materials.

Figure 8:
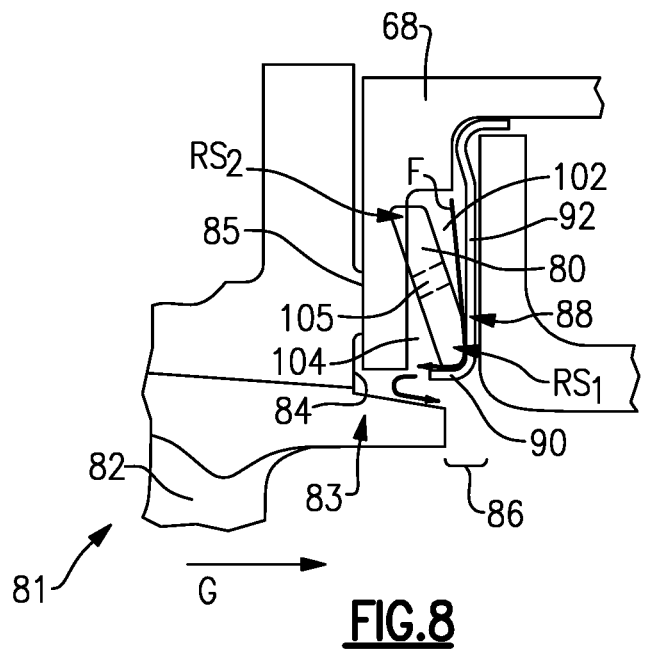
FIG. 8 illustrates an axial cross section of a seal arc segment mounted with a segmented heat shield.

As illustrated in FIG. 8, a fluid F may be provided to a cavity 102 to pressurize the cavity 102 between the spring 80 and the radially extending leg 92 of the segmented heat shield 88. In one example, the fluid F is cooling air. This pressurized fluid F may continue to flow radially inward as shown toward the radially inner end RS1 of the spring 80 and the axially-extending leg 90 of the segmented heat shield 88. The axially-extending leg 90 may direct the fluid F axially forward and radially outward toward a cavity 104 formed axially between the spring 80 and the carriage 68. The leg 90 may create a vortex a fluid in the cavity 104. The pressurized fluid F in the cavity 104 functions to further prevent gases from the gaspath G from flowing through the axial gap 86 radially outward toward the spring 80 and the carriage segment 68. Gas from the gas path is in turn prevented from entering the cavity 78.

The spring 80 may also include one or more passages 105, such as a hole, which would allow fluid F cooling air to pass from cavity 102, through the passage 105, to cavity 104. Thus, it is possible to further pressurize cavity 104 in a local region to further prevent gases from the gaspath G from flowing though the axial gap 86.

Figure 9:
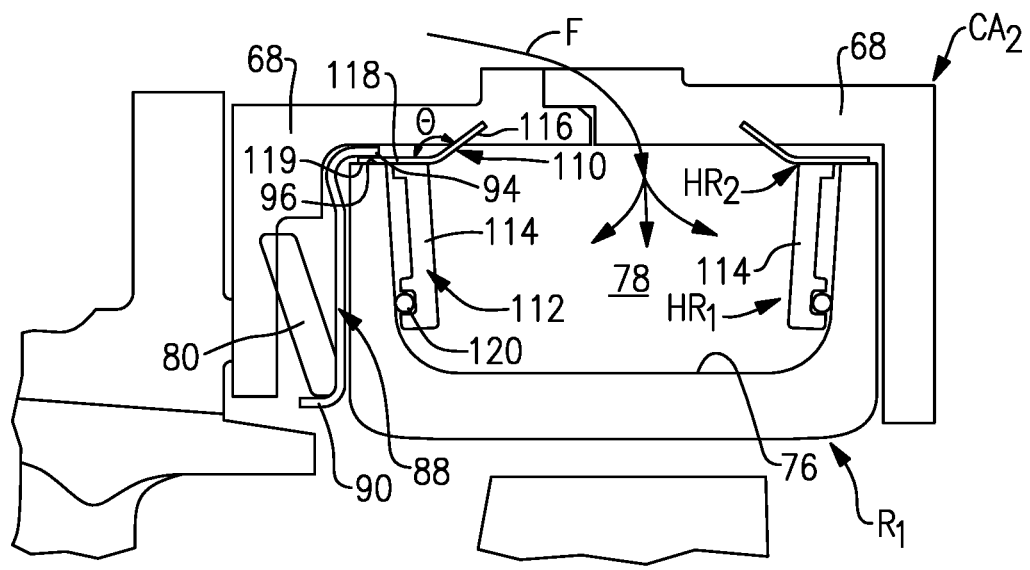
FIG. 9 illustrates an axial cross section of a second example seal arc segment mounted with a segmented heat shield.

As illustrated in FIG. 9, in another embodiment, the second axially extending leg 94 of the segmented heat shield 88 is radially outward of a sheet spring 110 configured to bias a rail shield 112 radially inward. The rail shield 112 is arranged in the pocket 78 of the seal arc segment 66. The rail shield 112 includes radially-extending walls 114, forming an opening at the radial end HR1 and an opening at the opposite radial end HR2. The rail shield 112 in this example is thus an endless band. The rail shield 112 is received in the pocket 78 such that the walls 114 line the radially extending sidewalls 74 of the pocket 78. Such a lining arrangement may or may not include contact between the walls 82 and the sidewalls 74. With the rail shield 112 in the pocket 78, the pocket 78 is still substantially open at the radial end R2 of the seal arc segment 66. The spring 110 contacts the carriage 68.

The spring 110 may be a sheet spring having a plurality of radially extending tabs 116 in contact with the carriage 68. The tabs 116 extend radially outward a distance to form an interference fit with the support structure 68. The spring 110 further includes an axially-extending section 118. The tabs 116 and the axially-extending section 118 may form an angle θ between 90 and 180 degrees. The radially inner surface 119 of the axially extending section 118 may be contiguous with a radially outer surface 96 of the sidewall 74. The axially-extending leg 94 is contiguous with the axially-extending section 118 of the spring 110 and may provide a radially inward force to maintain the contiguity between surfaces 119 and surface 96 when there is a reaction force radially inward on the tab 110 from the carriage 68. In one example, the sidewalls 74 are tapered in the radial direction, and the spring 110 maintains the rail shield 112 in the pocket 78.

The rail shield 112 allows the fluid flow F to flow into the pocket 78. This fluid F may be cooling air used to cool the radially inner surface 76 of the pocket 78. As one example, the air is from the compressor section 24. The walls 114 of the rail shield 112 serve as the protective barrier against direct exposure of the radially extending sidewalls 74 of the seal arc segment 66 to the fluid F. The leg 94 and the spring 110 may function to seal the sidewalls from the Fluid F at the radially outer end of the sidewall 74. The radial end HR1 of the rail shield 112, or a seal 120 between the rail shield 112 and the sidewall 74 if utilized, may serve as a second sealing point for the sidewalls 74 from the fluid flow F.

Due to its proximity to the gas path surface of the seal arc segment 66 at the end R1, the inner surface 76 of the pocket 78 experiences hotter temperatures than the sidewalls 74. Thus, to reduce the thermal gradient of the seal arc segment 66, the surface 76 may be cooled without cooling the sidewalls 74. The rail shield 112 and seal 120 (when applicable), properly positioned by the spring 110 secured by the leg 94, allow the inner surface 76 to be cooled by the fluid flow F without exposing the sidewalls to the fluid flow F. This flow path keeps temperature at the sidewalls 74 closer to the temperature of the rest of the seal arc segment 66, thereby reducing the thermal stresses in the seal arc segment 66 by reducing thermal gradient.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal assembly, comprising:
   a seal arc segment defining first and second seal supports;
   a carriage defining first and second support members, the first support member supporting the seal arc segment in a first ramped interface and the second support member supporting the seal arc segment in a second ramped interface;
   a spring configured to bias the seal arc segment axially; and
   a heat shield radially inward of the spring and having a radially-extending leg disposed axially between the spring and the seal arc segment.

2. The seal assembly as recited in claim 1, wherein the spring is configured to bias the seal arc segment axially toward the carriage.

3. The seal assembly as recited in claim 1, wherein the seal arc segment has a circumferential length, and the heat shield extends circumferentially substantially the circumferential length of the seal arc segment.

4. The seal assembly as recited in claim 1, wherein the heat shield includes a first axially-extending leg radially inward of the spring.

5. The seal assembly as recited in claim 4, wherein the heat shield includes a radially outer end with a second axially-extending leg.

6. The seal assembly as recited in claim 5, wherein the axially-extending leg radially inward of the spring extends in a first axial direction and the second axially-extending leg extends in a second axial direction opposite from the first axial direction.

7. The seal assembly as recited in claim 5, wherein the second axially-extending leg is disposed radially outward of the seal arc segment.

8. The seal assembly as recited in claim 1, the seal arc segment having first and second axial ends, the spring adjacent the first axial end and configured to bias the second axial end against the carriage.

9. The seal assembly as recited in claim 1, wherein the heat shield is a first material, and the carriage is a second material different from the first material.

10. The seal assembly as recited in claim 1, wherein
the carriage and the spring define a first cavity,
the heat shield and the spring define a second cavity, and
the spring includes a passage configured to provide communication between the first cavity and the second cavity.

11. The seal assembly as recited in claim 1, wherein the radially-extending leg interfaces with a portion of a surface of a sidewall of the seal arc segment axially opposite the sidewall from a second surface interior to a pocket of the seal arc segment.

12. A gas turbine engine, comprising:
a rotor rotatable about an axis;
a seal arc segment radially outward of the rotor defining first and second seal supports;
a carriage defining first and second support members, the first support member supporting the seal arc segment in a first ramped interface and the second support member supporting the seal arc segment in a second ramped interface;
a spring configured to bias the seal arc segment axially; and
a heat shield radially inward of the spring and having a radially-extending leg disposed axially between the spring and the seal arc segment.

13. The gas turbine engine as recited in claim 12, wherein the heat shield includes an axially-extending leg radially inward of the spring.

14. The gas turbine engine as recited in claim 13, further comprising:
a vane structure spaced axially from the rotor, wherein the axially-extending leg extends axially in the axial space between the vane structure and the rotor.

15. The gas turbine engine as recited in claim 11, wherein the spring is configured to bias the seal arc segment axially toward the carriage.

16. The gas turbine engine as recited in claim 11, wherein the seal arc segment has a circumferential length, and the heat shield extends circumferentially substantially the circumferential length of the seal arc segment.

17. The gas turbine engine as recited in claim 11, wherein
the carriage and the spring define a first cavity,
the heat shield and the spring define a second cavity, and
the spring includes a passage configured to provide communication between the first cavity and the second cavity.

18. A method of assembling a seal assembly, comprising:
providing a seal arc segment, the seal arc segment defining first and second seal supports;
supporting the seal arc segment on a carriage defining first and second support members, the first support member supporting the seal arc segment in a first ramped interface and the second support member supporting the seal arc segment in a second ramped interface;
biasing the seal arc segment axially with a spring; and
providing a heat shield radially inward of the spring and having a radially-extending leg disposed axially between the spring and the seal arc segment.

19. The method as recited in claim 18, wherein the heat shield includes an axially-extending leg radially inward of the spring.

20. The method as recited in claim 18, further comprising:
providing fluid to a cavity between the spring and the radially extending leg to pressurize the cavity.

* * * * *